F. B. PEASE.
FRUIT GRADING MACHINE.
APPLICATION FILED JUNE 1, 1914.
1,196,975.
Patented Sept. 5, 1916.
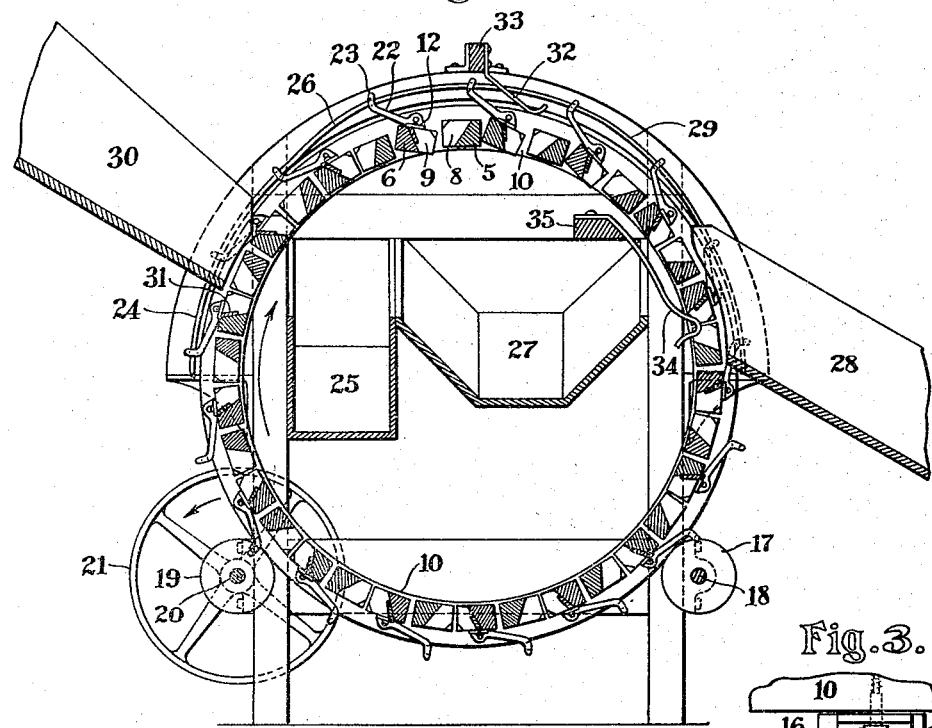
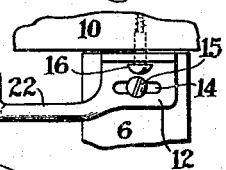
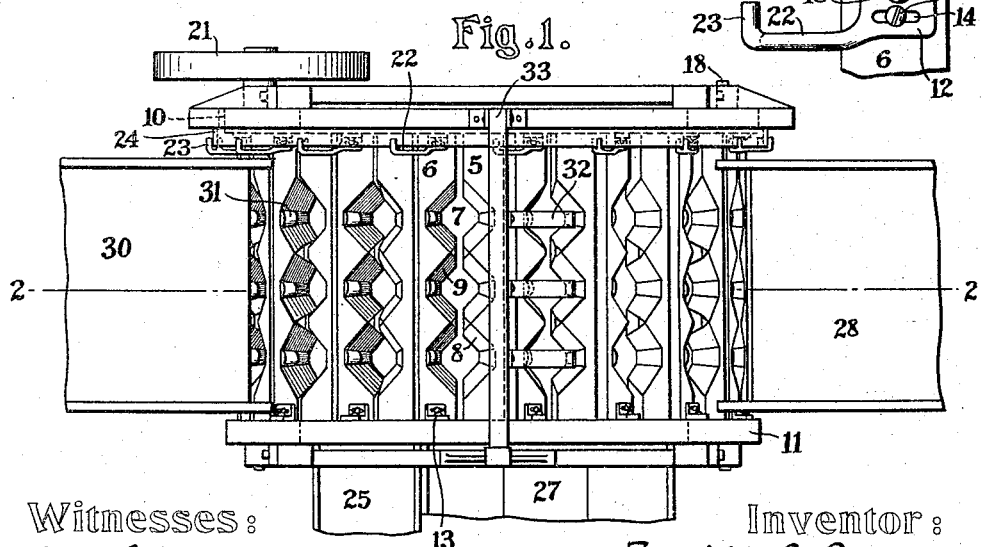
Witnesses:
C. W. Carroll
D. Gurnee
Inventor:
Franklin B. Pease
by his attorneys
Davis & Dorsey

UNITED STATES PATENT OFFICE.

FRANKLIN B. PEASE, OF ROCHESTER, NEW YORK.

FRUIT-GRADING MACHINE.

1,196,975.   Specification of Letters Patent.   Patented Sept. 5, 1916.

Application filed June 1, 1914. Serial No. 842,255.

*To all whom it may concern:*

Be it known that I, FRANKLIN B. PEASE, a citizen of the United States, and resident of Rochester, in the county of Monroe and State of New York, have invented certain new and useful Improvements in Fruit-Grading Machines, of which the following is a specification.

This invention relates to machines for grading apples, or other fruit, according to size or diameter.

The object of the invention is to produce a machine of simple construction, and, preferably, automatic operation, by which fruit may be graded into two or more sizes; and particularly to produce a machine adapted for grading fruit which, like apples, departs substantially from spherical form, the machine being adapted, when operating upon such fruit, to grade it strictly according to its greatest diameter. Apples frequently have an oblate form, with the greatest diameter in a plane normal to the core-axis, and the present machine is adapted to grade such apples in accordance with their diameter in said plane.

Another object of the invention is to produce a machine in which the parts may be readily adjusted to determine the sizes into which the fruit is graded.

Another object of the invention is to produce a machine, of the type in question, which will be self-feeding in a simple and effective manner, and a still further object is to provide against the liability of failure of the fruit to pass through and out of the receptacles in or by which it is gaged.

To the foregoing ends I employ, in my improved machine, gaging means having a plurality of substantially flat walls arranged in downwardly-converging position, and with substantially equal angles between adjacent walls, so as to produce a fruit-receptacle having a plurality of possible points of contact with the fruit, and in connection with these flat walls I employ means whereby the walls may be moved away from each other through predetermined distances, without substantially changing the angles between the adjacent walls, so that during this movement the distance between each of the pairs of opposite walls remains substantially equal. From this arrangement it results that no fruit of a generally round shape, whether it be of substantially spherical or oblate form, can pass through the space between these walls unless its greatest diameter is no greater than the distance between two opposite walls.

The invention further comprises the use of bars arranged in a series of coöperating pairs, each pair of bars being provided, on adjacent faces, with a plurality of coöperating recesses which form between them the gaging-receptacles just referred to, and in which the necessary relative movement of the parts is provided for in a simple manner by moving one of the bars away from the other.

Other features of construction, by which the foregoing objects are attained, will be set forth hereinafter, in connection with the description of the illustrated embodiment of the invention.

In the accompanying drawings:—Figure 1 is a plan-view of a machine embodying the present invention; Fig. 2 is a vertical section, on the line 2—2 in Fig. 1; and Fig. 3 is a detail-view, on a larger scale, showing a part of the means for supporting and actuating the pivotally movable gage-members.

The invention is illustrated as embodied in a machine particularly designed for grading apples, although substantially the same construction may be used for grading other fruit. The fruit is gaged between pairs of parallel gage-members or bars, each pair comprising a bar 5 and a bar 6. These bars are recessed, as shown particularly in Fig. 1, so as to form, between each pair, a series of fruit-receptacles 7. Each recess in each bar 5 is formed with two inclined flat walls 8, arranged at right-angles with each other, and the recesses in each bar 6 are similarly formed with inclined flat walls 9. Accordingly, each wall 8 in a bar 5 is opposed to a wall 9 in the corresponding bar 6, and the distances between the walls in these two pairs of opposed walls is equal. If a perfectly spherical fruit be introduced in the receptacle it can pass through the receptacle and between the bars only in case its diameter is somewhat less than the space between the opposed walls of either pair. If the fruit is of an oblate form it may enter the receptacle in such a position as to engage only two opposite walls, but in this case its portion of greatest diameter must engage at least two such walls, so that the fruit still cannot pass through the receptacle unless its greatest diameter is less than the space between the opposite walls.

The bars 5 are all rigidly fixed, at their ends, to two rings 10 and 11. Each bar 6 is fastened, at its respective ends, to pivot-plates 12 and 13, respectively, the connection between the plates and the bar being rendered adjustable by the use of a slot 14 in the pivot-plate and a screw 15 occupying the slot and threaded into the bar. Each pivot-plate is pivoted to one of the rings, 10 or 11, by means of a screw 16, as shown in Fig. 3.

The rings 10 and 11 are rotatably supported, in vertical planes, by means of rollers 17 and 19, the rollers 17 being arranged, in a pair, upon a horizontal shaft 18 journaled on the frame of the machine, and the rollers 19 being mounted on a similarly journaled shaft 20 at the front of the machine. The shaft 20 is also provided with a pulley 21, by which it may be rotated by connection with any suitable source of power, and when this shaft is driven the rollers 19 rotate the rings frictionally, in the direction of the arrow in Fig. 2.

The walls of the gaging-receptacles are shown as converging toward the bottoms of the receptacles, so that a fruit too large to pass between the walls at the bottom of a receptacle may still be received and seated in the receptacle. Thus, without any relative movement of the gage-members, the fruit may be divided into two sizes, the one small enough to pass through the receptacle, and the other too large to pass through, and in the latter case the fruit will be carried from the feeding-point to a point of discharge, where it may be ejected or caused to fall out of the larger end of the receptacle. In the illustrated machine, however, provision is made for grading fruit in three sizes. To this end I provide means for moving one gage-member of each pair away from the other after the reception of a fruit in each receptacle, so that a fruit too large to pass through the receptacle in its first or normal position may pass through after such relative movement of the gage-members. In this way I provide for a third, intermediate size or grade.

To move the gage-members as just described each of the pivot-plates 12 is provided with an integral arm 22 terminating in fingers 23. These fingers coöperate with a cam in the form of a flange 24, mounted upon the frame of the machine in position to be engaged by the arms 22 during a part of their path of movement. The first part of this cam is so formed as to engage and hold the arms in their normal innermost positions, with the gage-members close together. Supposing fruit to be introduced to the gaging-receptacles at this point, the smallest fruits pass through the receptacles and fall into a chute 25 located beneath the position occupied by the gage-members at the feeding-point. After the rotation of the rings has carried the gage-members of each pair beyond the chute 25, however, the arms 22 encounter a rise 26 in the cam 24, which causes each gage-bar 6 to be swung away from the corresponding bar 5, as shown in Fig. 2. At this time the gage-members have arrived at a position above a second chute 27, and any fruit small enough to pass through the receptacles in this position falls into the chute 27. The largest fruits remain in the gaging-receptacles until they are carried beyond the chute 27 and until the increasing inclination of the gage-bars, due to the curvilinear form of the rings by which they are supported, brings the receptacles to a position, at the rear of the machine, in which the fruit can roll out of the gaging-receptacles and be discharged into a chute 28. The chutes 25, 27 and 28 thus receive the fruit of the three grades, and may be arranged to discharge into barrels or other suitable receptacles.

In order to render the machine self-feeding, in a simple and effective manner, I employ a hopper 30 adapted to contain a supply of fruit, this hopper being open at its lower end, which is arranged adjacent to the position passed by the gage-members on their upward course. Owing to the tapered form of the gaging-receptacles the fruit may roll readily into them, and then be retained therein during the continued movement of the gage-members, and thus if the hopper 30 be kept supplied with fruit the gaging-receptacles will be automatically filled. To prevent possible injury to the fruit, by engagement with the advancing lips of the gage-members, I provide each bar 6 with a pad 31 of rubber, or other yielding material, at the angle of each gaging-recess.

To insure the proper discharge of the fruit through the gaging-receptacles, a series of yielding fingers 32 of resilient material is fixed, upon a transverse bar 33 on the frame of the machine, in position to engage the top of any fruit resting in a gaging-receptacle when passing over the chute 27. These fingers serve to overcome the resistance to free falling of the fruit which may result from the presence of leaves, stems, &c. To insure also the final discharge of the fruit from the receptacles, I employ a second series of spring fingers 34, fixed on a transverse bar 35 within the rings 10 and 11, these fingers being adapted to enter the bottoms of the gaging-receptacles and discharge any fruit which has become wedged therein.

The adjustable connections between the gage-bars 6 and the rings 10 and 11, as above described and as shown particularly in Fig. 3, permit the convenient adjustment of the gages for any required minimum size of fruit, and adjustment for the medium and large sizes may be made by removing the cam 24 and substituting another of different form or different degree of rise.

The last part 29 of the cam, as shown in Fig. 2, is formed to return the arms 22 to normal position, thus facilitating the final discharge of the fruit from the receptacles, and also leaving the arms in a position in which they are frictionally retained until they again engage the front end of the cam during the continued rotation of the rings 10 and 11.

It will be apparent that the relative movement of the gage-bars 5 and 6, while changing the diameters of the gaging-receptacles, does not change the rectangular relation of the flat walls of these receptacles, or the equality in the space between the opposite walls of the two pairs forming each receptacle, and thus the fruit is accurately graded according to its greatest diameter, however the gage-members may be adjusted or moved.

While I have shown the pairs of gage-members or bars as moved continuously by means of rotary rings, it will be obvious that movement may be imparted to them in other ways. It will also be apparent that the machine is not limited to the selection of three grades only, and that the invention, in general, is not limited to the embodiment thereof hereinbefore described and illustrated in the accompanying drawings.

I claim:—

1. A fruit-grading machine having, in combination, a gage provided with four fruit-engaging walls arranged, in substantially the position of the walls of a truncated square pyramid, so as to form an open-ended tapering receptacle, means for moving the walls of the gage apart while maintaining their rectangular relation, and means for selectively receiving the fruits which pass through the gage in the several relative positions of its walls.

2. A fruit-grading machine having, in combination, a gage comprising two coöperating members having opposed recesses in their adjacent sides, each recess providing two inclined walls arranged substantially at a right angle with each other, means for moving one gage-member away from the other through a predetermined distance, and means for selectively receiving the fruits which pass through the gage in the different relative positions of its members.

3. A fruit-grading machine having, in combination, a gage comprising two members with coöperative recesses in their adjacent sides, said recesses being formed to produce a fruit-receptacle substantially in the form of an open-ended truncated square pyramid; a hopper with a downwardly-directed opening, means for moving the gage past said opening and beneath the fruit in the hopper, means for moving one gage-member away from the other, during their continued movement above described, through a predetermined distance, and means for selectively receiving the fruits which fall through the gage in the different relative positions of its members.

4. A fruit-grading machine having, in combination, a gage comprising two members with coöperative recesses in their adjacent sides, said recesses being formed to produce a fruit-receptacle substantially in the form of an open-ended truncated square pyramid; a hopper with a downwardly-directed opening, means for moving the gage past said opening and beneath the fruit in the hopper, means for moving one gage-member away from the other, during their continued movement above described, through a predetermined distance, and means for selectively receiving the fruits which fall through the gage in the different relative positions of its members, the rear gage-member having a buffer of resilient material at its upper lip to prevent injury to the fruit in the hopper.

5. A fruit-grading machine having, in combination, a gage provided with four fruit-engaging walls arranged in substantially rectangular relation, means for moving the walls of the gage apart, while maintaining their rectangular relation, through predetermined distances, means for selectively receiving the fruits which pass through the gage in the several relative positions of its walls, and a yielding finger adapted to engage the fruit in the gage and force it downwardly between the gage-members after they have been moved apart.

6. A fruit-grading machine having, in combination, a gage comprising two members with coöperative recesses in their adjacent sides, said recesses being formed to produce a fruit-receptacle substantially in the form of an open-ended truncated square pyramid; a hopper with a downwardly-directed opening, means for moving the gage past said opening and beneath the fruit in the hopper, means for moving one gage-member away from the other, during their continued movement above described, through a predetermined distance, means for selectively receiving the fruits which fall through the gage in the different relative positions of its members, and a yielding finger adapted to engage the fruit in the gage and force it outwardly through the larger end of the fruit-receptacle after the gage-members have been moved apart.

7. In a fruit-grading machine, a gage comprising members having a plurality of oppositely-disposed pyramidally-arranged flat walls converging downwardly and arranged with approximately equal angles between adjacent walls; and means for moving certain of said walls away from the others through a predetermined distance while remaining parallel thereto.

8. A fruit-grading machine having, in combination, a series of gage-bars arranged parallel and coöperating in pairs, the bars of each pair having a series of coöperating fruit-receiving recesses in their adjacent walls; means for feeding fruit to all of the recesses between a pair of bars simultaneously; means for moving the bars of said series progressively and for moving one bar of each pair away from the other, through a predetermined distance, at a predetermined point in the path of movement of the bars; and a plurality of receiving-means located below said path of movement and adapted to receive selectively the fruits which fall between the bars in their several relative positions.

9. A fruit-grading machine having, in combination, a series of gage-bars arranged parallel and coöperating in pairs, the bars of each pair having a series of coöperating fruit-receiving recesses in their adjacent walls; means for moving the bars of said series progressively; means for imparting a pivotal movement to one bar of each pair about an axis parallel to the length of the bar, whereby it is swung away from the other bar through a predetermined distance while remaining parallel therewith; and a plurality of receiving-means located below the path of movement of the bars and adapted to receive selectively the fruits which fall between the bars in their several relative positions.

10. A fruit-grading machine having, in combination, a series of gage-bars arranged parallel and coöperating in pairs, the bars of each pair having a series of coöperating fruit-receiving recesses in their adjacent walls; means for moving the bars of said series progressively and for moving one bar of each pair away from the other, through a predetermined distance, at a predetermined point in the path of movement in the bars; means for adjusting the distance between the bars irrespective of the operation of the means for moving the bars; and a plurality of receiving-means located below said path of movement and adapted to receive selectively the fruits which fall between the bars in their several relative positions.

In testimony whereof, I affix my signature in presence of two witnesses.

FRANKLIN B. PEASE.

Witnesses:
FARNUM F. DORSEY,
D. GURNEE.

Copies of this patent may be obtained for five cents each, by addressing the "Commissioner of Patents Washington, D. C."